United States Patent [19]

Knutsson et al.

[11] Patent Number: 5,766,541
[45] Date of Patent: Jun. 16, 1998

[54] METHOD AND APPARATUS FOR MAKING PREFORMS FROM GLASS FIBER STRAND MATERIAL

[75] Inventors: Goran K. Knutsson; Bengt G. Nilsson; Lennart Svensson, all of Falkenberg, Sweden

[73] Assignee: O-C Fiberglas Sweden AB, Falkenberg, Sweden

[21] Appl. No.: 753,987

[22] Filed: Dec. 3, 1996

[51] Int. Cl.$^6$ .................................................. B29C 43/56
[52] U.S. Cl. ........................ 264/571; 264/101; 264/257; 425/80.1; 425/404; 425/405.1
[58] Field of Search ..................... 264/571, 101, 264/257; 425/80.1, 404, 405.1

[56] References Cited

U.S. PATENT DOCUMENTS

| | | |
|---|---|---|
| 3,054,714 | 9/1962 | Johnston . |
| 3,613,830 | 10/1971 | Hubbell . |
| 3,619,322 | 11/1971 | Fleissner . |
| 3,955,643 | 5/1976 | Clark . |
| 4,569,471 | 2/1986 | Ingemansson et al. . |
| 4,609,519 | 9/1986 | Pichard et al. . |
| 4,774,985 | 10/1988 | Broadbelt et al. . |
| 4,898,770 | 2/1990 | Dunbar . |
| 4,952,366 | 8/1990 | Gelin ........................ 264/511 |
| 4,961,700 | 10/1990 | Dunbar . |
| 5,009,941 | 4/1991 | Pollet et al. . |
| 5,024,890 | 6/1991 | Pollet et al. . |
| 5,026,410 | 6/1991 | Pollet et al. . |
| 5,034,181 | 7/1991 | Billiu ........................ 264/517 |
| 5,041,260 | 8/1991 | Johnson et al. ............... 264/510 |
| 5,076,393 | 12/1991 | Howerton et al. . |
| 5,146,052 | 9/1992 | Dümmel . |
| 5,220,137 | 6/1993 | Howerton et al. . |
| 5,256,366 | 10/1993 | Wejrock et al. ............... 264/510 |
| 5,281,778 | 1/1994 | Cheladyn et al. . |
| 5,418,339 | 5/1995 | Bowen et al. . |

FOREIGN PATENT DOCUMENTS

| | | |
|---|---|---|
| 446064A3 | 3/1990 | European Pat. Off. . |
| 2158001 | 11/1985 | United Kingdom . |

*Primary Examiner*—Mary Lynn Theisen
*Attorney, Agent, or Firm*—C. Michael Gegenheimer; Inger H. Eckert

[57] ABSTRACT

The present invention is directed to a method and apparatus for forming a preform from glass fiber strand material. The preform is formed by feeding continuous glass fiber strand material into a mold to form a continuous wool product in the mold; feeding a binder into the mold; compressing the mold to compact the wool product to a desired density; and heating the mold to cure the binder, such that a preform is formed having generally the shape of the compressed mold. The mold is then opened and the preform is removed from the mold.

20 Claims, 8 Drawing Sheets

5,766,541

METHOD AND APPARATUS FOR MAKING PREFORMS FROM GLASS FIBER STRAND MATERIAL

TECHNICAL FIELD AND INDUSTRIAL APPLICABILITY OF THE INVENTION

This invention relates to methods and apparatus for forming preforms from continuous glass fiber strand material. The preforms formed by the methods and apparatus of the present invention are adapted to be used as sound absorbing material such as in engine exhaust mufflers.

BACKGROUND OF THE INVENTION

It is common to include sound absorbing material in engine exhaust mufflers to dampen or attenuate the sound made by engine exhaust gases as they pass from the engine, through the exhaust system to atmosphere.

U.S. Pat. No. 4,569,471 to Ingemansson et al. describes a process and apparatus for feeding lengths of continuous glass fiber strands into a muffler outer shell such that the fiber strands are expanded into a wool-like material inside the shell. The process disclosed in the '471 patent requires that expensive apparatus be available at manufacturing locations where muffler shells are filled with sound absorbing material. Further, some muffler types have intricate shapes and, hence, are not easily filled with sound absorbing material such that the sound absorbing material uniformly fills the entire inner cavity of the muffler shell.

Accordingly, there is a need for a process and apparatus for producing sound absorbing material at one or more central locations, to reduce equipment costs, and where the sound absorbing material can be easily combined with muffler shells during subsequent assembly operations. There is further a need for a method and apparatus for forming sound absorbing material which uniformly fills muffler shells having intricate shapes.

SUMMARY OF THE INVENTION

The present invention is directed to a method and apparatus for making preforms from glass fiber strand material for use as sound absorbing material in engine exhaust mufflers. The preforms may be formed having various shapes which allow the preforms to be used in muffler shells having intricate shapes. Further, a binder is added with the strand material such that the preform maintains its shape so that it can be inserted into a muffler shell during a subsequent assembly operation.

In accordance with a first aspect of the present invention, a method is provided for forming a preform from continuous glass fiber strand material. The method comprises the steps of: feeding continuous glass fiber strand material into a perforated mold to form a wool product in the mold; feeding a binder into the mold; curing the binder to bond together portions of the strand material forming the compacted wool product, such that a preform is formed having generally the shape of the mold; opening the mold; and removing the preform from the mold.

Preferably, the method further includes the step of compressing the mold to compact the wool product to a desired density prior to curing. The binder may comprise a thermosetting material in powder form.

In accordance with a second aspect of the present invention, a method is provided for forming a preform for use in an engine exhaust muffler. The method comprises the steps of: feeding continuous length glass fiber strand material into a perforated mold to form a wool-type product in the mold; feeding a binder into the mold; feeding water into the mold; compressing the mold to compact the wool-type product to form a preform having a desired density and generally having the shape of at least a portion of an engine exhaust muffler; circulating hot air through the mold to cure the binder; opening the mold; and removing the preform from the mold.

In accordance with a third aspect of the present invention, an apparatus is provided for forming a glass fiber preform. The apparatus comprises: a perforated preform mold; a filling station at which the mold is filled with a binder and continuous glass fiber strand material to form a wool-type product in the mold; a compressing station at which the mold is compressed to compact the wool-type product to a desired density; a curing station at which the mold is heated to cure the binder to bond together portions of the strand material forming the wool-type product, such that a preform is formed having generally the shape of the compressed mold; and a removal station at which the mold is opened and the preform is removed from the mold. The filling, compressing and removal stations may comprise a single station.

In accordance with a fourth aspect of the present invention, a method is provided for forming a preform from glass fiber strand material. The method comprises the steps of: feeding glass fiber strand material into a mold to form a wool product in the mold; feeding a binder into the mold; curing the binder to bond together portions of the strand material forming the compacted wool product, such that a preform is formed having generally the shape of the mold; opening the mold; and removing the preform from the mold. Preferably, the mold is perforated. However, it is contemplated that the mold may be substantially nonperforated.

Accordingly, it is an object of the present invention to provide methods and apparatus for forming preforms from glass fiber strand material. It is further an object of the present invention to provide methods and apparatus for forming sound absorbing preforms from continuous glass fiber strand material which are adapted to be used in engine exhaust mufflers. These and other objects and advantages of the present invention will become apparent from the following detailed description, accompanying drawings and appended claims.

DETAILED DESCRIPTION AND PREFERRED EMBODIMENTS OF THE INVENTION

The present invention is directed to methods and apparatus for making preforms from continuous glass fiber strand material and binder material. The preforms are adapted to be used as sound absorbing material in engine exhaust mufflers, pneumatic tools and like devices.

Figure 1:
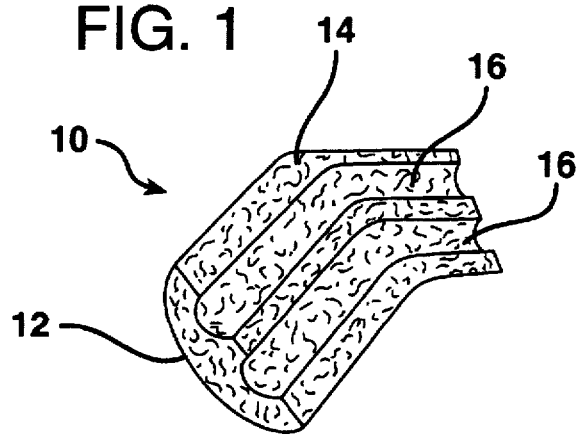
FIG. 1 shows a perspective view of a portion of a preform of this invention.
Figure 3:
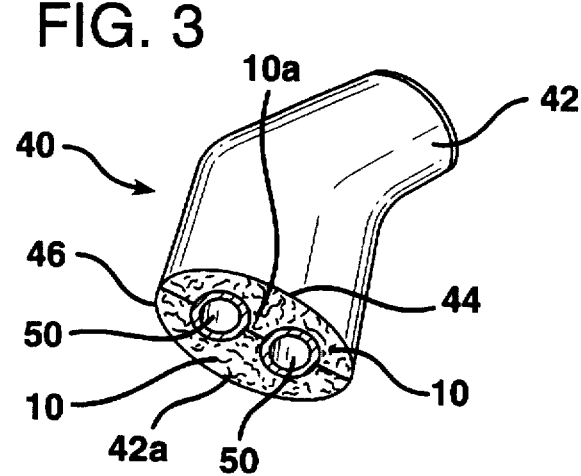
FIG. 3 shows a view, partially in cross-section, of a portion of a muffler packed with preforms of this invention.

A preform 10 formed in accordance with the present invention is shown in FIG. 1. It includes a rounded outer portion 12 and an inner portion 14 having indentations or recesses 16. The rounded outer portion 12 is adapted to conform to a portion of an inner surface 42a of an outer shell 42 of an engine exhaust muffler 40, see FIG. 3. The indentations 16 in the inner portion 14 accommodate two perforated muffler conduits or piping 50 which carry exhaust gases into the outer shell 42 of the muffler 40. While each of the two indentations 16 in the illustrated embodiment comprises two angularly oriented sections for accommodating angled piping 50, it is contemplated that the indentations 16 may have other shapes as well. Also, the preform 10 may be formed without any indentations or may have only one or more than two indentations 16.

The preform 10 illustrated in FIG. 1 is shaped so as to fill generally one half of the muffler outer shell 42. Accordingly, a second preform 10a having a complementary shape is combined with the preform 10 to fill the outer shell 42, see FIG. 3. The outer shell 42 comprises a first shell half 44 and a second shell half 46 which are weldably joined or otherwise fastened together after the two conduits 50 and the preforms 10 and 10a are placed between them.

Preferably, the weight of each of the preforms 10 and 10a is from about 100 g to about 6000 g. Further, the preform 10 of the present invention can be shaped so as to fit any portion of a muffler outer shell 42.

As noted above, the preform 10 is formed from continuous strand material and a binder. Preferably, water or another suitable wetting agent is also added. The continuous strand material may comprise any conventional reinforcement glass fiber strand. The term "glass fiber strand" as used herein shall mean a strand formed from a plurality of glass fibers. An example of such a strand is a commercially available roving. Glass fiber strands are preferred as glass fibers are resistant to the high levels of heat produced in the interior of an engine exhaust muffler. The strands may be formed from continuous E-glass or S-glass fibers. It is also contemplated that the strand material may be formed from other continuous fibers, which, preferably, are resistant to heat.

As will be discussed more explicitly below, the preform is formed by feeding continuous glass fiber strand material into a perforated mold. As the strand material is fed into the mold, the glass fibers forming the strand material separate from one another to form a wool-type product (i.e., a continuous wool product). The binder is added so as to bind the glass fibers of the wool-type product to one another such that the fibers maintain their shape once the preform 10 is removed from the perforated mold.

The binder may be any thermoplastic or thermoset material which can be produced in a powdered form or reduced into a powdered form, such as, for example, polyvinyl chloride, CPVC, polyethylene, polypropylene, nylon, poly (butylene terephthalate), poly(ethylene terephthalate), polyester, phenolics or solid epoxies. Also, high performance binders selected from the group consisting of liquid crystal polymers, polyetheretherketone and polyphenylene sulfide can be used. It is contemplated that thermoplastic binders may be employed when the preform is intended to be used in a low temperature application, e.g., as a sound absorbing material in a pneumatic tool. Preferably, a thermosetting binder, such as a phenolic binder, is used when the preform is intended to be used in a high temperature application, e.g., as a sound absorbing material in an engine exhaust manifold. A useful phenolic binder is one that is commercially available from Perstorp Chemitec of Brebieres, France under the product name PERACIT P182.

In the illustrated embodiment, the binder is dispersed in the form of fine particles. In a preferred embodiment, the size of the binder particles is from about 5 to about 500 microns, and preferably from about 50 to about 300 microns. The binder can be combined with the glass fiber strand material such that it comprises about 1% to about 30%, by weight, of the final preform 10. Preferably, the binder constitutes about 2% to about 10%, by weight, of the preform 10 and more preferably from about 2.5% to about 3.5%, by weight, of the preform 10.

Figure 2:
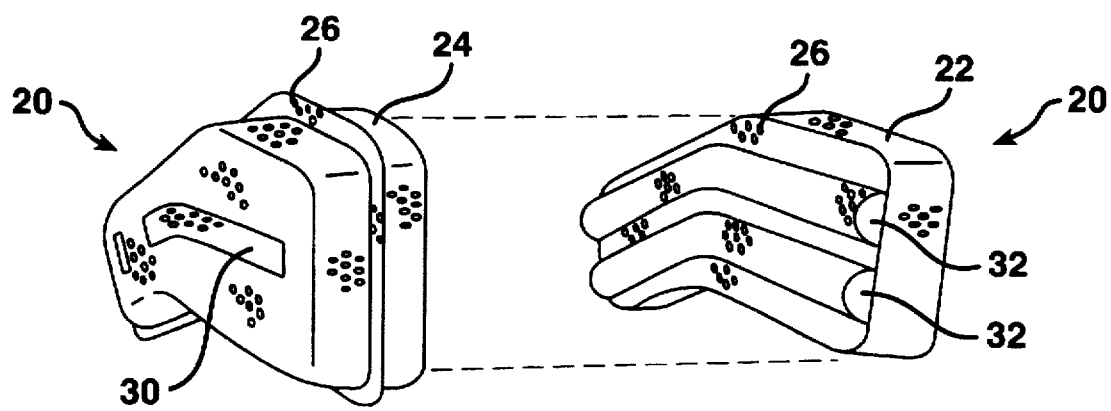
FIG. 2 shows a perspective view of separated male and female portions of a perforated mold used to make the preforms of this invention.

A perforated mold 20, separable into a male portion 22 and a female portion 24, as illustrated in FIG. 2, is provided for forming the preform 10. The two portions 22 and 24 are preferably formed from a metallic material such as steel. The female portion 24 includes an opening 30 which, in the illustrated embodiment, extends across a substantial portion of its length. The continuous glass fiber strand material and binder are added into the mold 20 through the opening 30. The opening 30 can have any shape or length which facilitates the feeding of the glass fiber strand material and the binder into the mold 20. The male portion 22 includes two raised portions 32 which form the indentations 16 in the preform 10 illustrated in FIG. 1. The shape and number of the raised portions 32 can be varied. The shape and size of the mold 20 can be varied to form preforms of varying sizes and shapes to accommodate different muffler types.

A muffler shell may include partitions (not shown) which divide the inner cavity of the muffler shell into sections. Accordingly, the male portion or the female portion of the mold may be formed with one or more partitions (not shown) positioned so as to correspond to partitions provided in the muffler shell.

Figure 4:
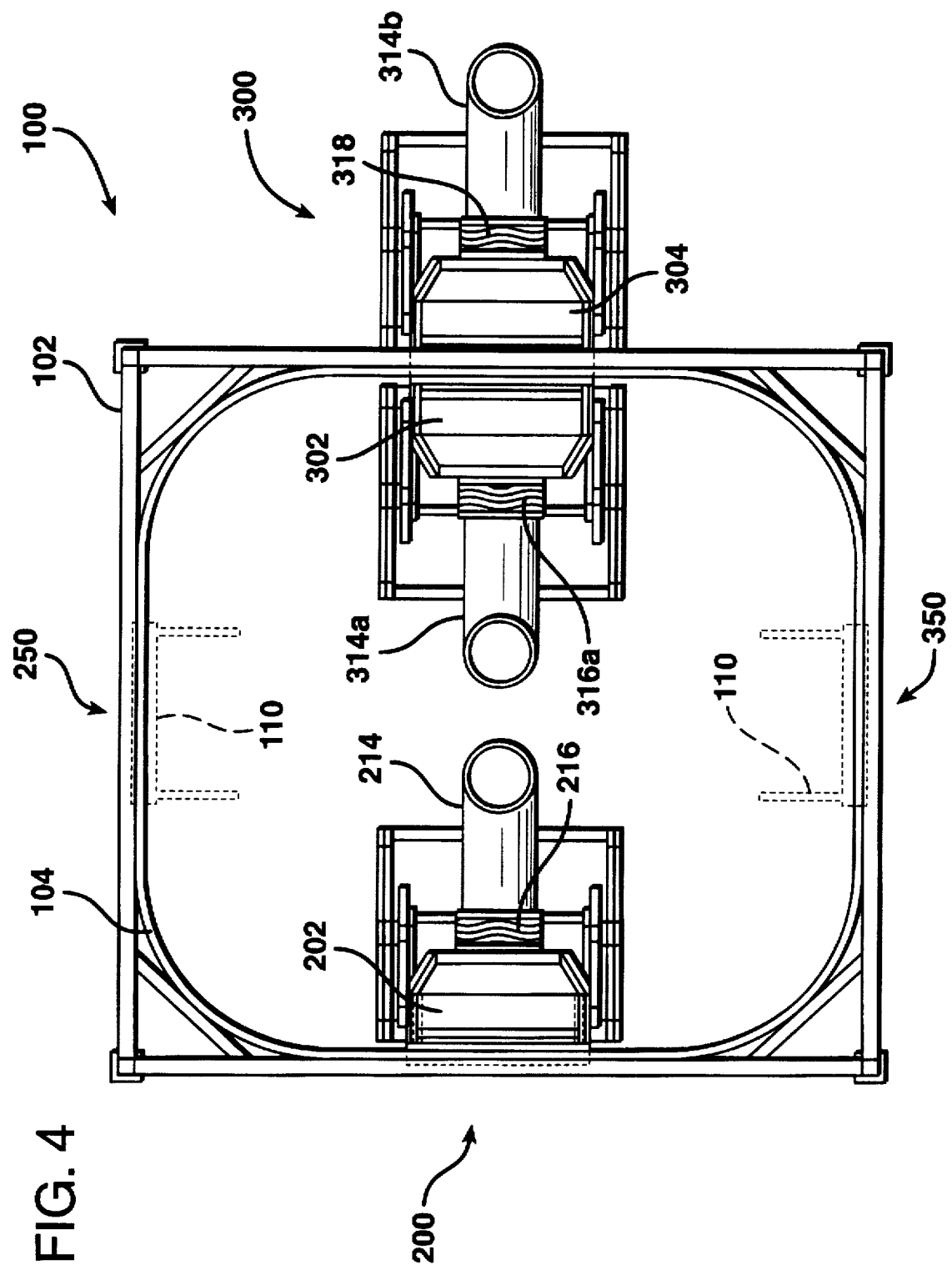
FIG. 4 shows a plan view of an apparatus which can be used to make the preforms of this invention.

Apparatus 100 constructed in accordance with the present invention for making the preform 10 is illustrated in FIG. 4. The apparatus 100 comprises a frame 102, an overhead track 104, a lower track (not shown), at least one mold carrier 110 (two are shown in phantom in FIG. 4), a filling and cooling station 200, a first idle station 250, a curing station 300 and a second idle station 350. The overhead track 104 and the lower track are mounted to the frame 102. The mold carriers 110 are movably mounted on the overhead track 104 and engage the lower track. The cooling and filling station 200 includes one cooling and filling docking head 202 and the curing station 300 comprises two curing docking heads 302 and 304.

During operation of the apparatus 100, each mold carrier 110 carries at least one mold 20. Two molds 20 are provided on the carrier 110 illustrated in FIG. 5. The mold carrier 110 carries the molds 20 from the filling and cooling station 200, where each mold 20 is filled with glass fiber strand material and a binder, to the first idle station 250. The first idle station 250 is a holding station. The mold carrier 110 moves from the idle station 250 to the curing station 300, where the binder is cured. After curing, the mold carrier 110 moves to the second idle station 350 before returning to the filling and cooling station 200. At the filling and cooling station 200, the molds 20 are cooled and the preforms 10 are removed from the molds 20. A separate cooling and removal station (not shown) can be provided in place of the idle station 350. The mold carriers 110 are moved about the overhead track 104 by a conventional conveyor system (not shown) such as a chain conveyor, a screw conveyor, a belt conveyer, an electromagnetic conveyor or other similar conveyor system. It is also contemplated that each carrier 110 may have its own independent drive mechanism such that it is movable independently of the other carriers 110.

Figure 5:
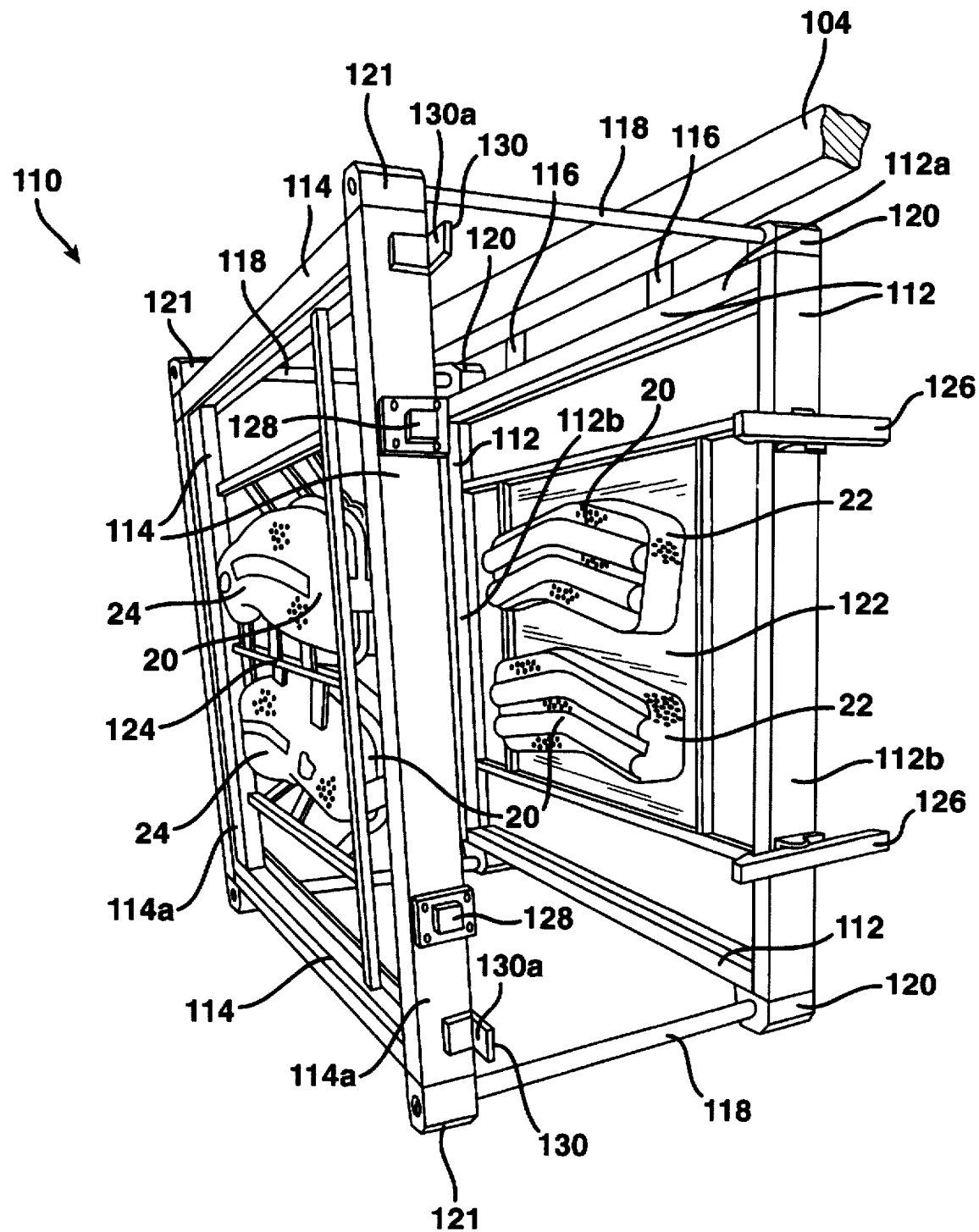
FIG. 5 shows a perspective view of a carrier of the present invention.

Referring now to FIG. 5, the mold carrier 110 includes a first support structure 112 and a second support structure 114. The first support structure 112 is slidably mounted on the track 104 by hangers 116 such that the mold carrier 110 is movable about the track 104. Two linear bearings 120 are fixedly coupled to an upper portion 112a of the first support structure 112. Two shafts 118 are fixedly coupled to second support structure supports 121 and extend from the second support structure 114 to the first support structure 112 where they are received by the bearings 120 such that the second support structure 114 is movable back and forth relative to the first support structure 112. A plurality of brackets 130 are fixedly mounted to side portions 114a of the second support structure 114. Only two of the four brackets 130 provided on the second structure 114 are shown in FIG. 5.

The brackets 130 are provided so that the second support structure 114 can be moved relative to first support structure 112 in a manner to be described below.

Two male mold portions 22 are fixedly mounted to a first mold plate 122, which is removably mounted to the first support structure 112. Likewise, two female mold portions 24 are weldably mounted on a frame 124, which is removably mounted to the second support structure 114.

The second support structure 114 is positioned in a mold filling position when it has been moved adjacent to the first support structure 112. In this position, the male and female mold portions 22 and 24 engage with one another such that the molds 20 are in their glass fiber strand material/binder receiving positions. The second support structure 114 is positioned in a mold compression position when it has been moved into or nearly into engagement with the first support structure 112. The second support structure 114 is positioned in a mold release position when it has been moved away from the first support structure 112, see FIG. 5.

A plurality of pivotable clamp arms 126, four are provided in the illustrated embodiment, are mounted to side portions 112b of the first support structure 112. The clamp arms 126 lockingly engage protruding clamp portions 128 which are fixedly coupled to the side portions 114a of the second support structure 114 in order to maintain the first and second support structures 112 and 114 in engagement with one another. The clamp arms 126 are spring biased and, hence, are self-engaging with the clamp portions 128. Release of the clamp arms 126 from the clamp portions 128 will be discussed below.

Figure 6:
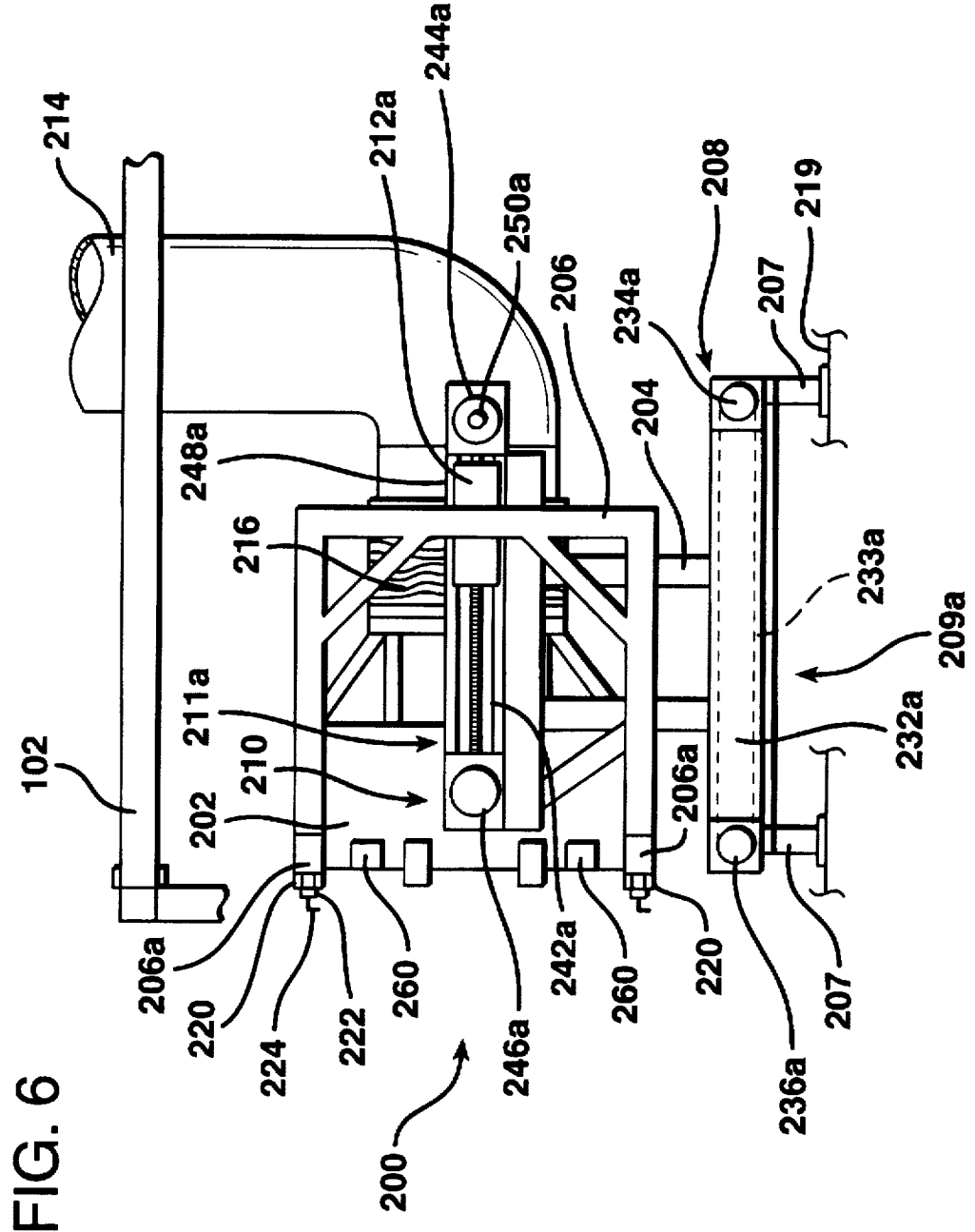
FIG. 6 shows a side view of a cooling and filling station of the apparatus of the present invention.
Figure 7:
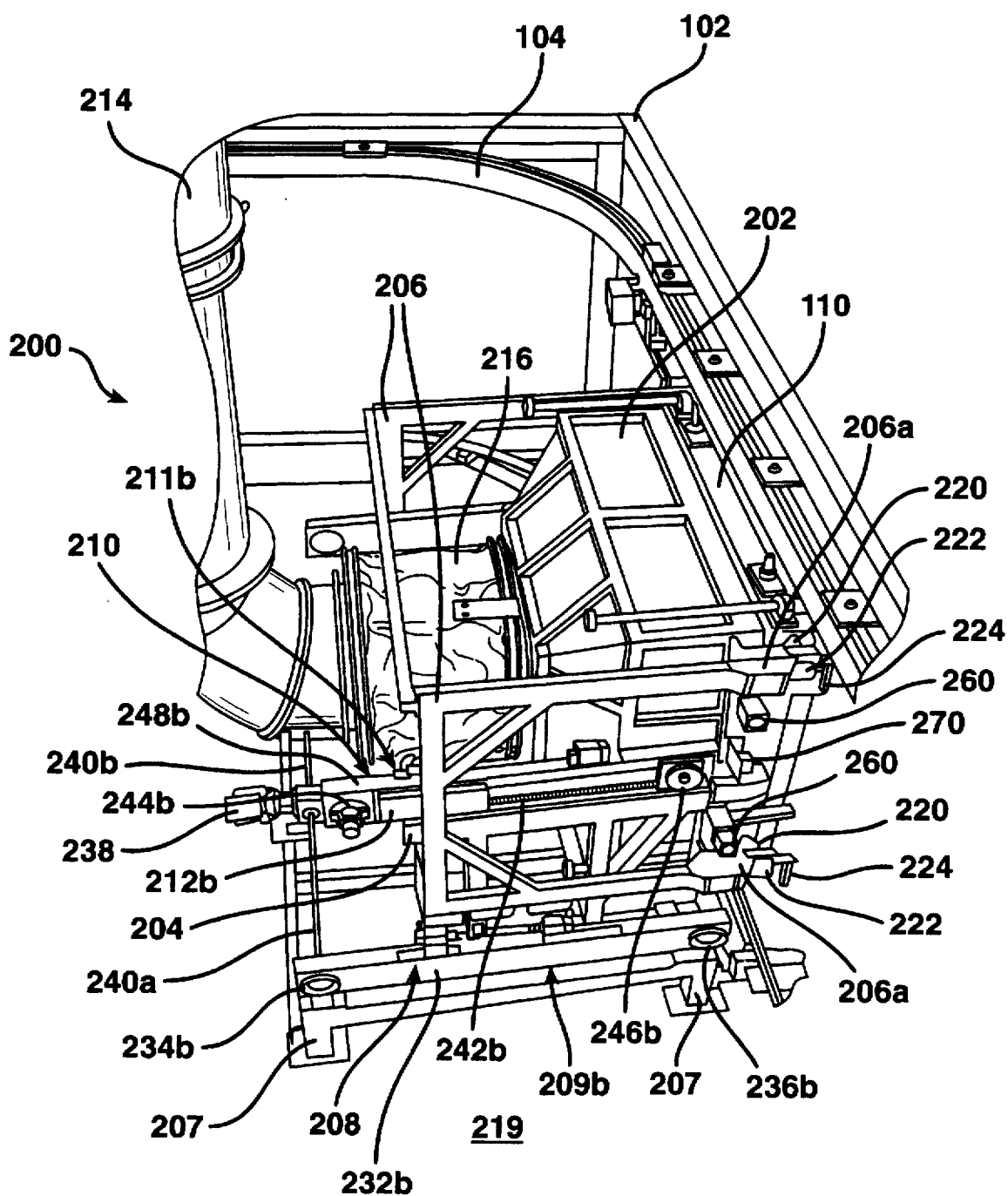
FIG. 7 shows a perspective view of the cooling and filling station.

The cooling and filling station 200 will now be described with reference to FIGS. 6 and 7. The cooling and filling station 200 includes, in addition to the docking head 202, a first frame portion 204, a second frame portion 206 and a third frame portion 207. The third frame portion 207 is fixed to a floor 219. The first frame portion 204 is movably mounted to the third frame portion 207 and is moved relative to the third frame portion 207 by a first belt drive system 208. The second frame portion 206 is movably mounted to the first frame portion 204 and is moved relative to the first frame portion 204 by a second belt drive system 210. The docking head 202 is fixedly coupled to the first frame portion 204 so as to move with the first frame portion 204.

The first belt drive system 208 includes a first drive assembly 209a and a second drive assembly 209b which are mounted respectively in housings 232a and 232b. The housings 232a and 232b are fixedly mounted to the third frame portion 207. The first drive assembly 209a includes a first belt 233a having a toothed profile which extends about first and second drive pulleys 234a and 236a which also have a toothed profile. The second drive assembly 209b includes a second belt (not shown) having a toothed profile which extends about third and fourth drive pulleys 234b and 236b which also have a toothed profile. The first drive system 208 also includes a motor 238 and first and second drive shafts 240a and 240b which are rotatably coupled to the first and third drive pulleys 234a and 234b. The motor 238 is rotatably coupled to the drive shafts 240a and 240b such that rotation of the motor 238 effects rotation of the first and second belts 233a. The first and second belts 233a are fixedly coupled to the first frame portion 204 via conventional coupling structure (not shown) such that back and forth movement of the first and second belts 233a effects back and forth movement of the first frame portion 204 relative to the third frame portion 207.

The second belt drive system 210 includes a first drive assembly 211a and a second drive assembly 211b which are mounted respectively in housings 248a and 248b. The housings 248a and 248b are fixedly mounted to the first frame portion 204. The first drive assembly 211a includes a first belt 242a having a toothed profile which extends about first and second drive pulleys 244a and 246a which also have a toothed profile. The second drive assembly 211b includes a second belt 242b having a toothed profile which extends about third and fourth drive pulleys 244b and 246b which also have a toothed profile. The second drive system 210 also includes a motor 250a having an output shaft rotatably coupled to the first drive pulley 244a which, in turn, is rotatably coupled to the third drive pulley 244b via a drive shaft (not shown) extending between the first and third drive pulleys 244a and 244b. Rotation of the motor output shaft effects rotation of the first and second belts 242a and 242b. The belts 242a and 242b are fixedly coupled via conventional coupling structure (not shown) to mounts 212a and 212b, which in turn are fixedly coupled to the second frame portion 206. Back and forth movement of the first and second belts 242a and 242b effects back and forth movement of the second frame portion 206 relative to the first frame portion 204.

A bellows or expansion portion 216 is provided between the docking head 202 and a conduit 214. The docking head 202 communicates with an airflow system (not shown) through the bellows 216 and the conduit 214. The bellows 216 allows the docking head 202 to move toward and away from the conduit 214. The airflow system may comprise a conventional fan (not shown) which can produce either positive air flow into the docking head 202 or draw a vacuum through the docking head 202.

Two pairs of pusher plates 220 are mounted on end portions 206a of the second frame portion 206. When a mold carrier 110 is positioned adjacent to the docking head 202, the plates 220 are adapted to engage the brackets 130 provided on the second support structure 114 of the mold carrier 110 to move the second support structure 114 away from the first support structure 112 to its mold release position, see FIG. 5. The second belt drive system 210 effects movement of the second frame portion 206 away from the conduit 214 such that the pusher plates 220 engage and effect movement of the second support structure 114 away from the first support structure 112.

Two pairs of rotary drive units 222 are mounted on the end portions 206a of the second frame portion 206. Arm portions 224 extend from drive shafts of the units 222. When a mold carrier 110 is positioned adjacent to the docking head 202, the second frame portion 206 has been properly positioned relative to the second support structure 114 of the mold carrier 110 and the arm portions 224 have been rotated via the drive units 222 so as to engage or nearly engage outer portions 130a of the brackets 130, the second belt drive system 210 can be actuated to effect movement of the second frame portion 206 toward the conduit 214 such that the second support structure 114 is moved toward the first support structure 112 to its mold filling position.

A pair of clamp cylinders 260 are mounted to the second frame portion 206 on each side of the docking head 202. The clamp cylinders 260 are positioned such that when the clamp arms 126 are in engagement with the clamp portions 128, the cylinders 260 can be actuated to pivot and release the clamp arms 126 from engagement with the clamp portions 128.

A proximity sensor 270 is mounted to the second frame portion 206. The sensor 270 is adapted to sense an edge of the mold carrier 110 and generate a signal to a control processor (not shown) which deactivates the first drive system 208 so as to prevent the docking head 202 from damaging the mold carrier 110 as the docking head 202 moves into contact with the mold carrier 110.

Figure 8:
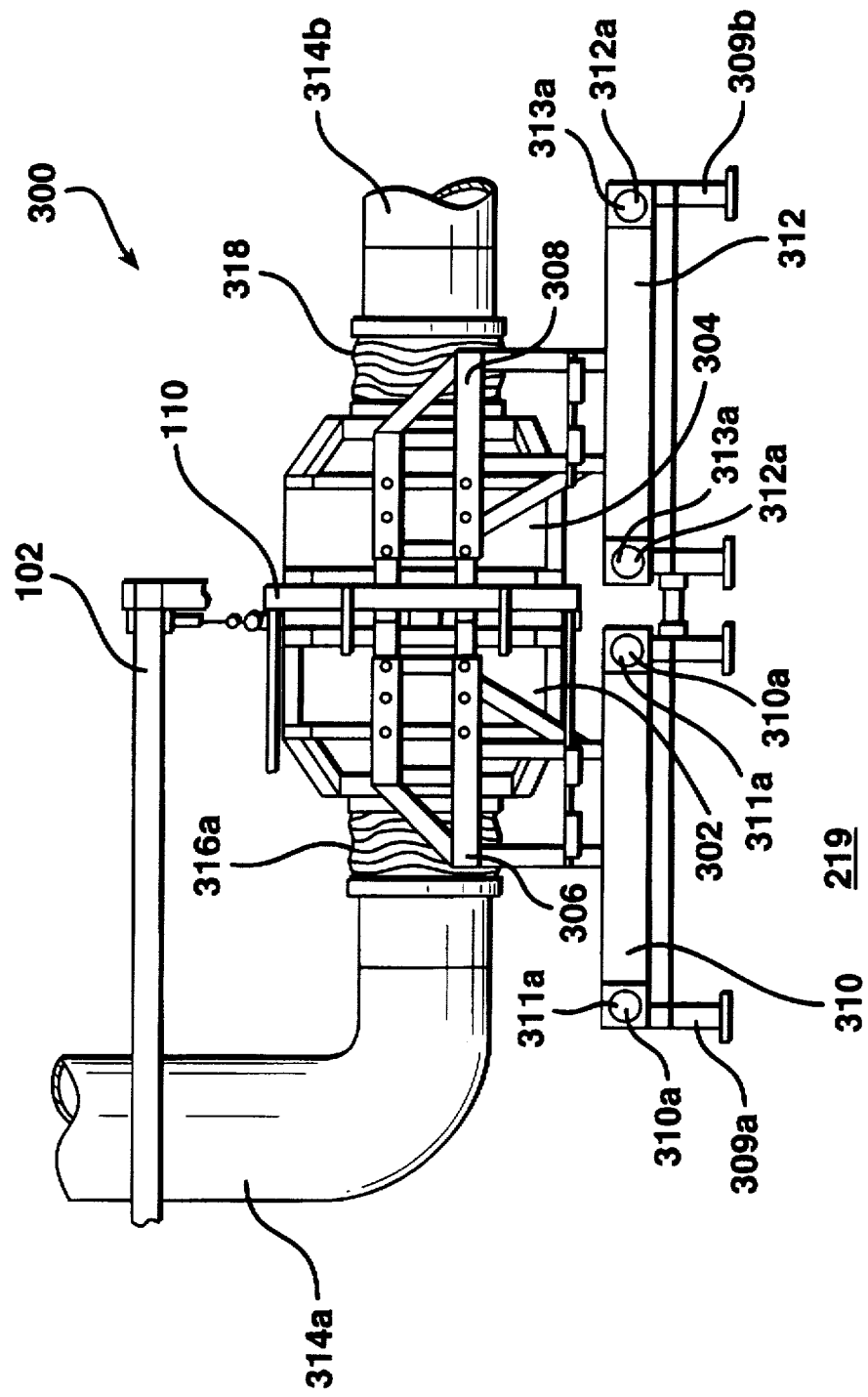
FIG. 8 shows a side view of the curing station of the apparatus of the present invention.

As noted above, the curing station 300 includes first and second curing docking heads 302 and 304. The first docking head 302 is mounted on a first curing station frame 306 and the second docking head 304 is mounted on a second curing station frame 308, see FIG. 8. The first frame 306 is movably mounted to a third frame 309a which, in turn, is fixed to the floor 219. The second frame 308 is movably mounted to a fourth frame 309b which, in turn, is fixed to the floor 219. A first curing station drive system 310a, portions of which are mounted to a housing 310, is provided for effecting movement of the first frame 306 relative to the third frame 309a. A second curing station drive system 312a, portions of which are mounted to a housing 312, is provided for effecting movement of the second frame 308 relative to the fourth frame 309b. The first curing station drive system 310a is similar in construction to the first belt drive system 208 set out above and includes first and second drive assemblies positioned on opposite sides of the first frame 306 (only portions of the first drive assembly 311a are shown in FIG. 8). The second curing station drive system 312a is also similar in construction to the first belt drive system 208 and includes third and fourth drive assemblies positioned on opposite sides of the second frame 308 (only portions of the third drive assembly 313a are shown in FIG. 8). The first, second, third and fourth drive assemblies of the first and second curing station drive systems 310a and 312a are constructed in essentially the same manner as the first and second drive assemblies 209a and 209b set out above and, hence, will not be discussed in further detail herein.

The first docking head 302 communicates with a first conduit 314a through a bellows 316a. The bellows 316a allows the first docking head 302 to move relative to the fixed conduit 314a. Likewise, the second docking head 304 communicates with a second conduit 314b through a bellows 318. The bellows 318 allows the second docking head 304 to move relative to the fixed conduit 314b. An air system (not shown) is provided for moving air through the conduits 314a and 314b. A heater device (not shown) is provided for heating the air passing through the conduits 314a and 314b. Thus, when a mold carrier 110 having molds 20 filled with glass fiber strand material and binder is positioned between the first and second docking heads 302 and 304, as shown in FIG. 8, heated air is passed through the conduits 314a and 314b and the mold carrier 110 such that the heated air effects curing of the binder material in the molds 20. Any type of conventional heater, such as an electric or gas heater, may be used.

When two molds 20 of a mold carrier 110 are to be filled with continuous glass fiber strand material and binder, the mold carrier 110 is moved to the filling and cooling station 200 adjacent to the docking head 202. Initially, the docking head 202 is moved into contact with the mold carrier 110 via the first belt drive system 208. If the molds 20 are filled with preforms 10, a vacuum is drawn through the conduit 214 and, hence, through the mold carrier 110 and the molds 20 to cool the preforms 10. After the preforms 10 have been cooled, the clamp cylinders 260 are actuated to release the clamp arms 126 from the clamp portions 128. The second frame portion 206 is then moved away from the conduit 214 via the second belt drive system 210 such that the pusher plates 220 engage and effect movement of the second support structure 114 away from the first support structure 112. Movement of the second support structure 114 away from the first support structure 112 opens the molds 20. The preforms 10 are then removed from the molds 20.

As noted above, cooling and removal could occur at a separate cooling and removal station (not shown) positioned where the idle station 350 is located. The removal station would be constructed in essentially the same manner as station 200 so as to effect cooling, disengage clamp arms 126 from the clamp portions 128 and move the second support structure 114 away from the first support structure 112.

To close the molds 20, the second frame portion 206 is first positioned via the second belt drive system 210 such that the arm portions 224 can be rotated via the drive units 222 to engage or nearly engage the outer portions 130a of the brackets 130. Once the arm portions 224 are rotated by the drive units 222 to engage or nearly engage the bracket portions 130a, the second belt drive system 210 is actuated to effect movement of the second frame portion 206 toward the conduit 214 such that the second support structure 114 is moved inwardly by the arm portions 224 toward the first support structure 112 to its mold filling position.

The continuous glass fiber strand material is fed at room temperature into the molds 20 through the openings 30 in the female portions 24 by a feed apparatus 500, which will be described below. The continuous length of strand material fed into each mold 20 is blown apart and entangled to form a wool-type product in the molds 20. A powder binder and water are also fed into the molds 20. As noted above, the binder, once it has cured or solidified, binds the glass fibers to one another such that the fibers maintain their shape once the preforms 10 are removed from the molds 20. The water is provided to wet down the binder. The water decreases curing time, reduces powder dust, and reduces binder loss. Further, because of the addition of water, the binder adheres better to the glass fibers. Preferably, the strand material, the binder and the water are fed simultaneously into the molds 20 by the feed apparatus 500.

While the fiber strand material, the binder and the water are being fed into the molds 20 through the openings 30, a vacuum is pulled through the docking head 202 and, hence, through the molds 20. The male and female portions 22 and 24 are provided with perforations 26 such that a vacuum is applied to the molds 20 via the docking head 202. The vacuum applied to the molds 20 helps ensure that the strand material can be evenly distributed throughout each of the molds 20 and is evenly packed in the molds 20. As noted above, an airflow system (not shown) is provided which draws a vacuum through the conduit 214 and the docking head 202.

The amount of glass fiber strand material fed into each of the molds 20 is measured, in the illustrated embodiment, by measuring the length of the strand material fed into the feed apparatus 500. The strand material may be fed to the feed apparatus 500 from a spool source by a feeder means (not shown), such as disclosed in U.S. Pat. No. 4,569,471, the disclosure of which is incorporated herein by reference. A counter (not shown) may be associated with the feeder means to provide an indication of the length of strand material fed to the feed apparatus 500. A breaker roller (not shown), such as disclosed in the '471 patent, may also be provided to break the cohesive layer between fibers comprising the strand material.

Once the molds 20 are filled with the desired amount of wool-type material, the molds 20 are then compressed to compact the wool-type material to a desired density. To compact the wool-type material, the second mold support structure 114 of the mold carrier 110 is moved toward the first mold support structure 112 causing the female portions 24 to be moved toward the male portions 22. The second support structure 114 is pulled toward the first support structure 112 by the arm portions 224 which engage the brackets 130 on the support structure 114. The second belt drive system 210 is actuated to effect movement of the second frame portion 206 toward the conduit 214 such that the second support structure 114 is moved inwardly by the arm portions 224 into or nearly into engagement with the first support structure 112 to compact the wool-type material. The spring-biased clamp arms 126 self-engage the clamp portions 128 as the second support structure 114 moves to its mold compression position. Once the clamp arms 126 are engaged with the clamp portions 128, the first and second support structures 112 and 114 are releasably locked together.

After the molds 20 have been filled and compressed and before the mold carrier 110 is moved to the curing station 300, the second frame portion 206 is positioned via the second belt drive system 210 such that the arm portions 224 can be rotated by the rotary drive units 222 out of engagement with the mold carrier 110. The second frame portion 206 is then moved away from the mold carrier 110 and toward the conduit 214 via the second belt drive system 210. Also, the docking head 202 is retracted from engagement with the mold carrier 110 by moving the first frame portion 204 toward the conduit 214 via the first belt drive system 208.

From the filling and cooling station 200, the mold carrier 110 is moved about the overhead track 104 by the conveyor system (not shown) to the idle station 250 and then to the curing station 300. At the curing station 300, the first and second docking heads 302 and 304 are moved into engagement with the mold carrier 110 by the first and second curing station drive systems 310a and 312a. Heated air is then supplied via the air system (not shown) through the conduits 314a and 314b. Thus, heated air also passes through the mold carrier 110 and its molds 20 and effects the curing of the binder material in the molds 20. The desired temperature of the heated air will depend, inter alia, upon the type of binder employed, the density of the fiber material in the molds 20, and the amount of air flow through the perforated molds 20. For example, the temperature of the hot air passing through the molds 20 may be from about 100° C. to about 400° C. When a phenolic binder is used and the preform has a density of from about 100 to about 140 g/liter, the curing temperature is from about 300° C. to about 400° C. and the curing time is approximately 45 seconds.

After curing has been effected, the first and second docking heads 302 and 304 are retracted from the mold carrier 110. The mold carrier 110 is then moved to the idle station 350 before returning to the filling and cooling station 200. As noted above, the mold carrier could be moved to a separate cooling and removal station positioned where the idle station 350 is located. At the filling and cooling station 200, the docking head 202 is moved into engagement with the mold carrier 110. A vacuum is pulled through the conduit 214 and, hence, through the mold carrier 110 and the molds 20 such that the preforms 10 are cooled. After the preforms 10 have been cooled, the clamp arms are disengaged from the clamp portions 128 and, while the vacuum is being pulled through the molds 20, the second support structure 114 is moved away from the first support structure 112. In this way, the female portions 24 are removed from the male portions 22 without retaining the preforms 10. Once the female portions 24 have been separated from the male portions 22, the air flow through the conduit 214 is reversed and air is blown through the mold carrier 110 and, hence, through the male portions 22, thereby causing the preforms 10 to be dislodged from the male portions 22. Preferably, the preforms 10 are blown onto a conveyor (not shown) which moves the preforms 10 to a packing station (not shown).

Figure 9:
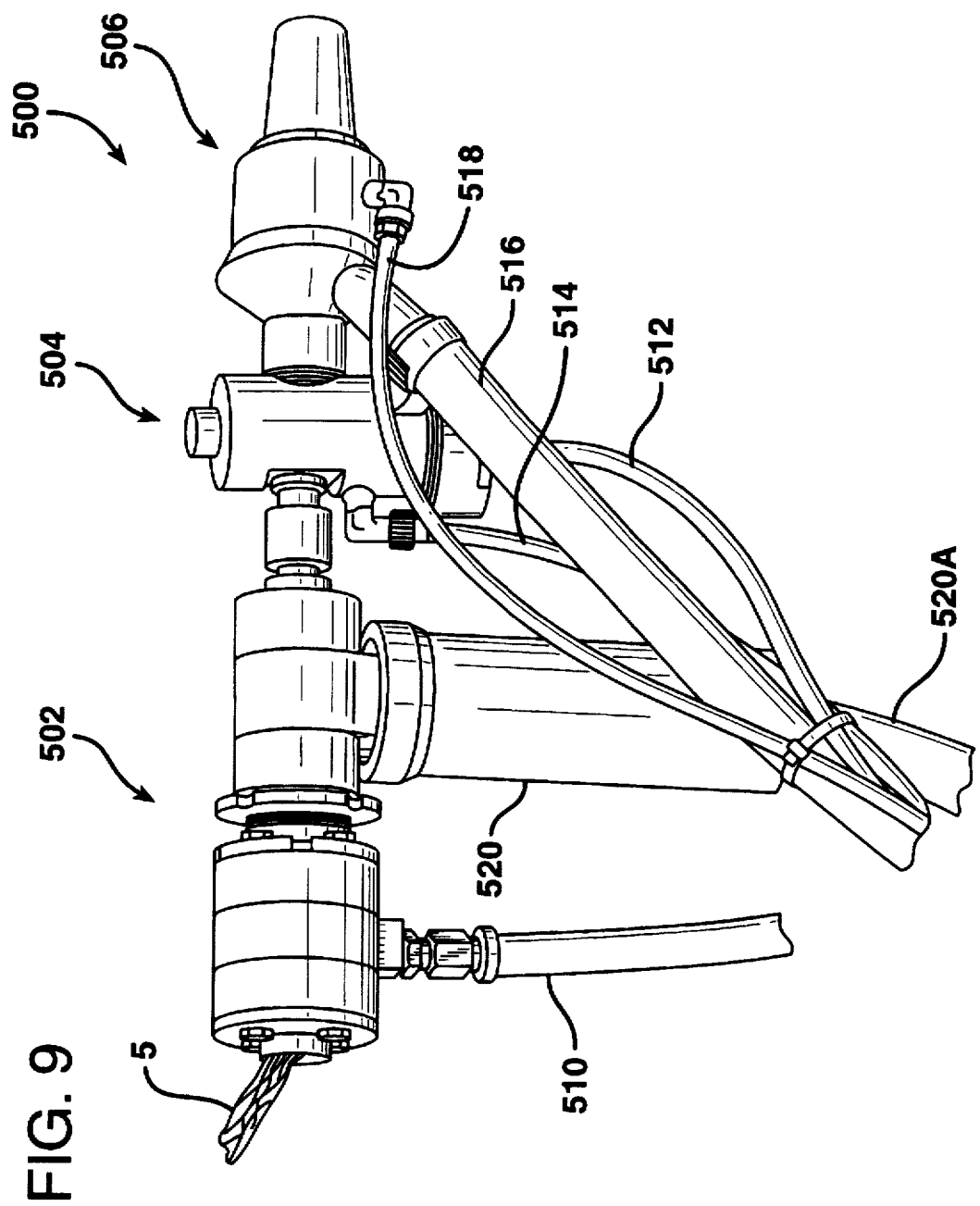
FIG. 9 shows a perspective view of a feed apparatus of the present invention.

The feed apparatus 500, which feeds the strand material 5 into the molds 20, will now be described with reference to FIGS. 9 and 10. The feed apparatus 500 comprises a fiber feeding portion 502, a knife portion 504 and a binder feeding portion 506. A central channel 522 extends through the center of the feed apparatus 500 through the fiber feeding portion 502, the knife portion 504 and the binder feeding portion 506. The feed apparatus 500 may also include a handle 520 to facilitate holding the feed apparatus 500 during the strand material feeding operation. The strand material 5 is pulled into the fiber feeding portion 502 by means of compressed air, as will be discussed further below. A knife blade 550 is provided in the knife portion 504 and is used to cut the strand material 5 once the desired amount of strand material 5 has been fed into one of the molds 20.

Figure 10:
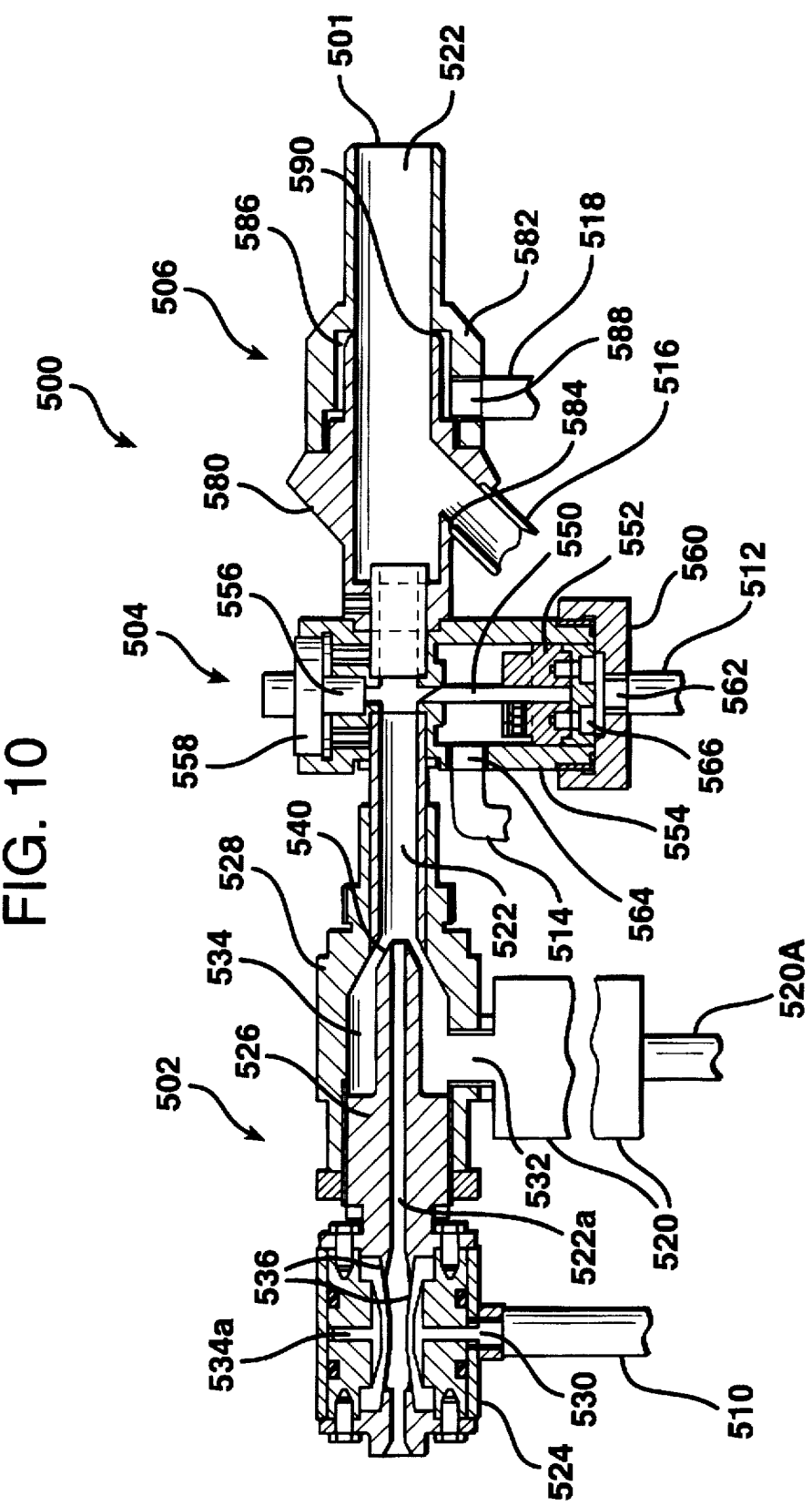
FIG. 10 shows a cross sectional view of the feed apparatus in FIG. 9.

FIG. 10 is a cross-sectional view of a preferred embodiment of the feed apparatus 500 of this invention with some structures shown schematically for ease of illustration. The fiber feeding portion 502 includes a first nozzle portion 524, an internal nozzle portion 526 and an external nozzle portion 528 which is detachably mounted to the internal nozzle portion 526. An aperture 530 is provided in the first nozzle portion 524 which is connected to and communicates with an air supply tube 510. An aperture 532 is provided in the external nozzle portion 528 which is connected to and communicates with an air tube 520a.

Compressed air to effect and control the flow of the strand 5 through the central channel 522 is provided through the aperture 532 in the external nozzle portion 528 via the air tube 520a. The external nozzle portion 528 and internal nozzle portion 526 form an annular cavity 534 into which the compressed air flows. The cavity 534 encircles the central channel 522 and directs air flow into the central channel 522 through the open end 540 of the cavity 534. The pressurized air exiting the open end 540 impinges upon the strand material 5 and effects movement of the strand material 5 toward an outlet 501.

A diaphragm 536 in the first nozzle portion 524 encircles the central channel 522. Air flow through the aperture 530 and into an annular cavity 534a inflates the diaphragm 536 to hold the strand material 5 in a substantially fixed position while it is being cut by the knife blade 550 in the knife portion 504.

The knife portion 504 is detachably connected to the fiber feeding portion 502. The knife portion 504 contains the knife blade 550, a piston 552, a cylinder 554, an anvil 556, a cylinder cap 558, and a cylinder base 560. The knife blade 550 is removably mounted in the piston 552 and secured therein by a set screw. The piston 552 reciprocates vertically in the cylinder 554 to similarly move the blade 550, see FIG. 10. The anvil 556 is mounted on the cylinder cap 558 which seals the cylinder 554 at one end. The cylinder 554 is sealed at the end opposite the cylinder cap 558 by the cylinder base 560. The piston 552 is reciprocated in the cylinder 554 by means of compressed air introduced into the cylinder 554 through a first aperture 562 in cylinder base 560 and a second aperture 564 in the cylinder 554. A knife support plate 566 is also positioned in the cylinder 554.

The binder feeding portion 506 is detachably connected to the knife portion 504. The binder feeding portion 506 includes a first nozzle portion 580 and a second nozzle portion 582. The first nozzle portion 580 includes a binder supply inlet 584 which is connected to and communicates with a binder feeding tube 516. Binder entering the supply inlet 584 is diagonally fed into the central channel 522. The first nozzle portion 580 and the second nozzle portion 582 define an annular cavity 586. The second nozzle portion 582 includes an aperture 588 which is connected to and communicates with a water feeding tube 518. Water entering the aperture 588 is fed into the annular cavity 586. The water exits the cavity 586 through a gap 590 between the first nozzle portion 580 and the second nozzle portion 582 and enters the central channel 522 to wet the binder, as described above.

The strand material 5 is fed through the feed apparatus 500 in the following manner. The strand material 5 enters the apparatus through the fiber feeding portion 502. Compressed air introduced into the central channel 522 through the open end 540 of the cavity 534 draws the strand material 5 along an initial portion 522a of the central channel 522. Once the strand material 5 is contacted by the air stream exiting the open end 540, it is then blown through the remainder of the channel 522 by that stream of air. As the strand material 5 passes through the binder feeding portion 506, it is combined with binder and water. As noted above, the binder is fed into the central channel 522 through the binder supply inlet 584 and the water is fed into the central channel 522 through the aperture 588. Preferably, the amount of water fed into the central channel 522 is about 2% to about 4% of the total weight of the strand material 5, the binder and the water exiting through the outlet 501 and entering a mold 20.

After an appropriate length of the strand material 5 has been fed into one of the molds 20, the strand material 5 is cut by operation of the knife 504 as described. Air flow into the central channel 522 is stopped once the appropriate length of the strand material 5 is fed into one of the molds 20. To retain the strand material 5 in the feed apparatus 500, pressurized air enters the cavity 534a through the aperture 530 to inflate the diaphragm 536. With the diaphragm 536 expanded, the strand material 5 is trapped and held stationary in the central channel 522.

As the strand material 5 is being held stationary in the channel 522, the knife 504 is activated to cut the strand material 5. The piston 552, on which the knife blade 550 is mounted, is moved upwardly in the cylinder 554 by air pressure provided through the air tube 512 and the aperture 562. This pressure causes the knife blade 550 to strike the anvil 556 severing the strand material 5. The piston 552 is returned to its unoperated position on the knife support plate 566 by gravity and air pressure fed into the cylinder 554 through the aperture 564 by the air tube 514. Air can also be fed into the cylinder 554 through the aperture 564 to prevent movement of the piston 552 in the cylinder 554.

It is also contemplated that the strand material 5 be fed into the molds 20 by the nozzle disclosed in the referenced '471 patent.

One skilled in the art will also appreciate that the invention is not limited to the precise methods and apparatus described herein, and that changes can be made to this apparatus and method without departing from the scope of the invention, which is defined in the appended claims.

What is claimed is:

1. A method for forming a preform from continuous glass fiber strand material comprising the steps of:
   feeding continuous glass fiber strand material into a perforated mold to form a wool product in the mold;
   feeding a binder into the mold;
   curing the binder to bond together portions of the strand material forming the wool product, such that a preform is formed having generally the shape of the mold;
   opening the mold; and
   removing the preform from the mold.

2. The method according to claim 1 wherein the glass fiber strand material and the binder are fed simultaneously with water into the mold.

3. The method according to claim 1 further including the step of applying a vacuum to the mold to facilitate feeding of the fiber strand material into the mold.

4. The method according to claim 3 wherein the glass fiber strand material comprises glass fibers selected from the group consisting of E-glass fibers and S-glass fibers.

5. The method according to claim 1 further including the step of compressing the mold prior to curing to compact the wool product to a desired density.

6. The method according to claim 1 wherein the binder is a thermosetting material.

7. The method according to claim 6 wherein the thermosetting material is a phenolic binder.

8. The method according to claim 1 wherein the binder comprises a powder binder.

9. A method for forming a preform for use in an engine exhaust muffler comprising the steps of:
   feeding continuous length glass fiber strand material into a perforated mold to form a wool product in the mold;
   feeding a binder into the mold;
   feeding water into the mold;
   compressing the mold to compact the wool product to form a preform having a desired density and generally having the shape of at least a portion of an engine exhaust muffler;
   circulating hot air through the mold to cure the binder;
   opening the mold; and
   removing the preform from the mold.

10. The method according to claim 9 further including the step of applying a vacuum to the mold to facilitate the feeding of the glass fiber strand material into the mold.

11. The method according to claim 10 further including the step of applying a second vacuum to the mold to cool the mold after the binder has been cured.

12. The method according to claim 11 wherein the glass fiber strand material, the binder and the water are fed into the mold through a single feeding apparatus.

13. An apparatus for forming a glass fiber preform comprising:

a perforated preform mold;

a filling station at which the mold is filled with a binder and continuous glass fiber strand material to form a wool product in the mold;

a compressing station at which the mold is compressed to compact the wool product to a desired density;

a curing station at which the mold is heated to cure the binder to bond together portions of the strand material forming the wool product, such that a preform is formed having generally the shape of the compressed mold; and a removal station at which the mold is opened and the preform is removed from the mold.

14. The apparatus of claim 13 further including a cooling station at which the mold is cooled after being heated to cure the binder to facilitate removal of the preform from the mold.

15. The apparatus of claim 14 wherein the filling station includes a device for applying a vacuum to the mold to facilitate feeding the fiber strand material into the mold.

16. The apparatus of claim 13 further including a feeding device which feeds the fiber strand material into the mold simultaneously along with the binder and the water.

17. A method for forming a preform from glass fiber strand material comprising the steps of:

feeding glass fiber strand material into a mold to form a wool product in the mold;

feeding a binder into the mold;

curing the binder to bond together portions of the strand material forming the wool product, such that a preform is formed having generally the shape of the mold;

opening the mold; and removing the preform from the mold.

18. The method according to claim 17 further including the step of compressing the mold to compact the wool product to a desired density.

19. The method according to claim 17 wherein the binder is a thermosetting material.

20. The method according to claim 17 wherein the mold is perforated.

* * * * *